US012587364B2

(12) United States Patent
Dai et al.

(10) Patent No.: US 12,587,364 B2
(45) Date of Patent: Mar. 24, 2026

(54) METHOD OF DATA TRANSMISSION, AND ELECTRONIC DEVICE

(71) Applicant: JINGDONG TECHNOLOGY HOLDING CO., LTD., Beijing (CN)

(72) Inventors: Ziying Dai, Beijing (CN); Tiecheng Wang, Beijing (CN)

(73) Assignee: JINGDONG TECHNOLOGY HOLDING CO., LTD., Beijing (CN)

( * ) Notice: Subject to any disclaimer, the term of this patent is extended or adjusted under 35 U.S.C. 154(b) by 286 days.

(21) Appl. No.: 18/283,543

(22) PCT Filed: Apr. 2, 2022

(86) PCT No.: PCT/CN2022/085190
§ 371 (c)(1),
(2) Date: Sep. 22, 2023

(87) PCT Pub. No.: WO2022/213956
PCT Pub. Date: Oct. 13, 2022

(65) Prior Publication Data
US 2024/0163084 A1 May 16, 2024

(30) Foreign Application Priority Data
Apr. 6, 2021 (CN) .......................... 202110368291.X

(51) Int. Cl.
*H04L 9/08* (2006.01)
*H04L 9/00* (2022.01)

(52) U.S. Cl.
CPC ............ *H04L 9/0825* (2013.01); *H04L 9/008* (2013.01); *H04L 9/0869* (2013.01)

(58) Field of Classification Search
None
See application file for complete search history.

(56) References Cited

U.S. PATENT DOCUMENTS

| | | | |
|---|---|---|---|
| 2010/0042842 A1 | 2/2010 | Huang et al. | |
| 2017/0201371 A1 | 7/2017 | Yagisawa | |

(Continued)

FOREIGN PATENT DOCUMENTS

| | | |
|---|---|---|
| CN | 109359470 A | 2/2019 |
| CN | 111354416 A | 6/2020 |

(Continued)

OTHER PUBLICATIONS

International Search Report for PCT/CN2022/085190, dated May 18, 2022, 5 pages.

(Continued)

*Primary Examiner* — Bassam A Noaman
(74) *Attorney, Agent, or Firm* — Lippes Mathias LLP

(57) ABSTRACT

A method of data transmission is provided. The method includes: generating an encryption public key and an evaluation public key by interacting with other data providing ends; generating ciphertext data by encrypting local data with the encryption public key, and sending the ciphertext data to a data using end; receiving a ciphertext calculation result sent by the data using end, in which the ciphertext calculation result is determined by the data using end based on the evaluation public key and the ciphertext data received; and acquiring plaintext data by decrypting the ciphertext calculation result with a private key fragment of the data providing end.

15 Claims, 5 Drawing Sheets

(56) References Cited

U.S. PATENT DOCUMENTS

| | | | | |
|---|---|---|---|---|
| 2019/0327088 A1* | 10/2019 | Camenisch | ............... | H04L 9/14 |
| 2020/0074112 A1* | 3/2020 | Ren | ..................... | G06F 16/9027 |
| 2020/0127830 A1* | 4/2020 | Kim | ........................ | H04L 9/002 |
| 2020/0366467 A1 | 11/2020 | Kim et al. | | |
| 2023/0325529 A1* | 10/2023 | Sav | .................... | G06F 21/6245 |
| | | | | 726/26 |

FOREIGN PATENT DOCUMENTS

| | | | |
|---|---|---|---|
| CN | 111740815 A | 10/2020 | |
| CN | 113810170 A | 12/2021 | |
| EP | 3739806 A1 | 11/2020 | |
| JP | 2018124513 A | 8/2018 | |
| WO | 2014010202 A1 | 1/2014 | |

OTHER PUBLICATIONS

OA for CN application 202110368291.X dated Jun. 20, 2024, 10 PGS.

English translation of OA for CN application 202110368291.X, 10 PGS.

Ningbo et al. "Design of Directional Decryption Protocol Based on Multi-key Fully Homomorphic Encryption in Cloud Environment" NeTINFO Security, Jun. 2020, DOI: 10.3969/J.ISSN.1671-1122. 2020.06.002, 7 PGS—English Abstract.

OA for JP application 2023-560083 dated Sep. 11, 2024, 7 PGS.

English translation of OA for JP application 2023-560083, 7 PGS.

* cited by examiner

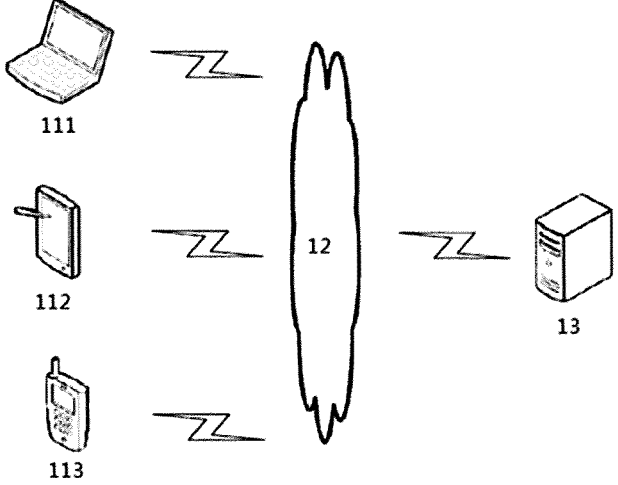

FIG. 1

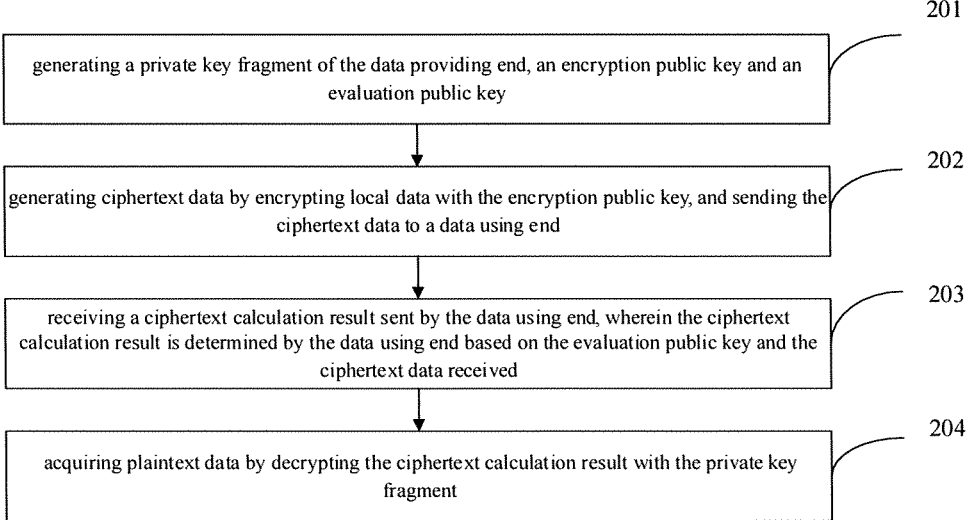

201
generating a private key fragment of the data providing end, an encryption public key and an evaluation public key 202
generating ciphertext data by encrypting local data with the encryption public key, and sending the ciphertext data to a data using end 203
receiving a ciphertext calculation result sent by the data using end, wherein the ciphertext calculation result is determined by the data using end based on the evaluation public key and the ciphertext data received 204
acquiring plaintext data by decrypting the ciphertext calculation result with the private key fragment

FIG. 2

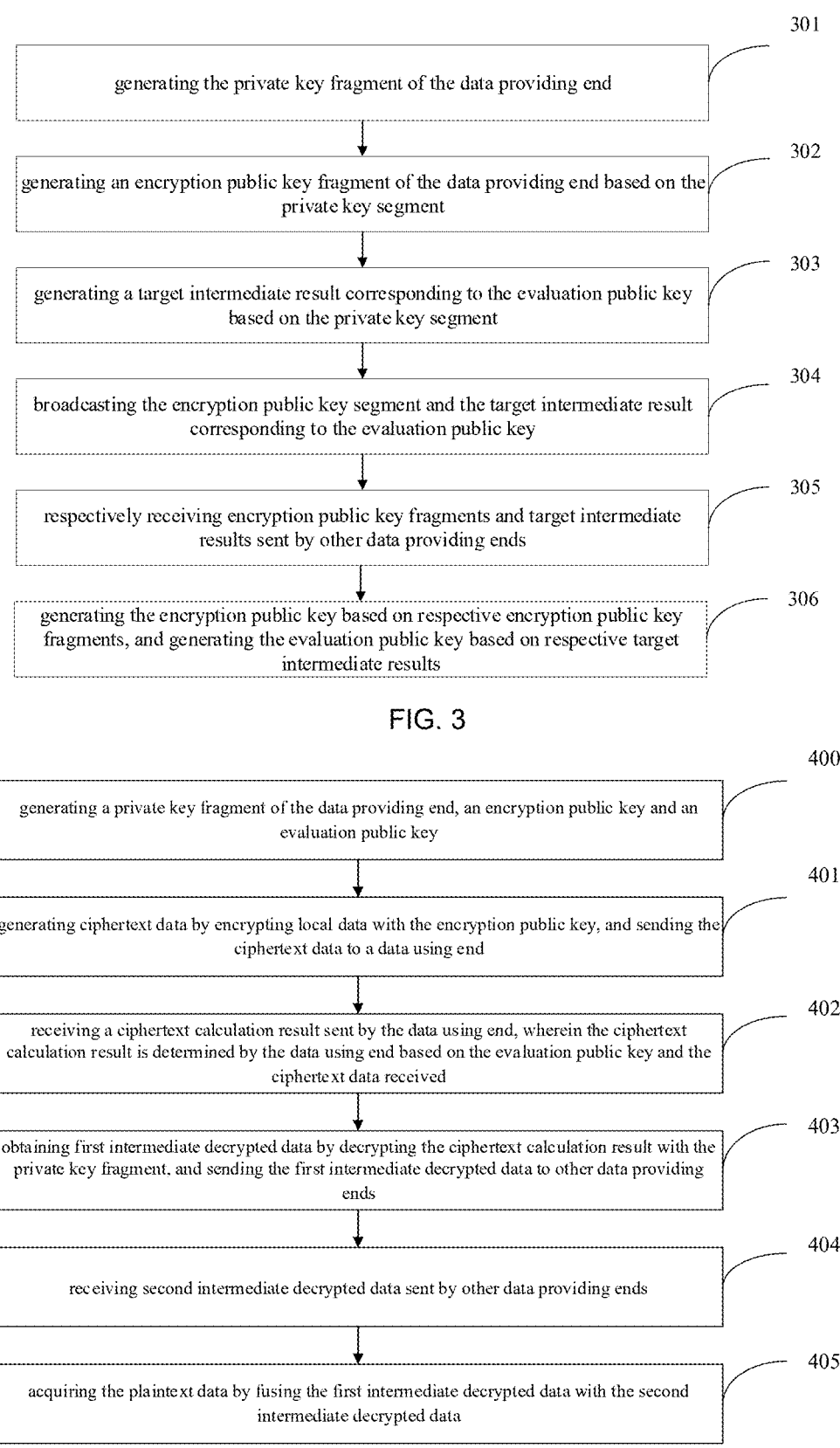

301 generating the private key fragment of the data providing end

302 generating an encryption public key fragment of the data providing end based on the private key segment

303 generating a target intermediate result corresponding to the evaluation public key based on the private key segment

304 broadcasting the encryption public key segment and the target intermediate result corresponding to the evaluation public key

305 respectively receiving encryption public key fragments and target intermediate results sent by other data providing ends

306 generating the encryption public key based on respective encryption public key fragments, and generating the evaluation public key based on respective target intermediate results

FIG. 3

400 generating a private key fragment of the data providing end, an encryption public key and an evaluation public key

401 generating ciphertext data by encrypting local data with the encryption public key, and sending the ciphertext data to a data using end

402 receiving a ciphertext calculation result sent by the data using end, wherein the ciphertext calculation result is determined by the data using end based on the evaluation public key and the ciphertext data received

403 obtaining first intermediate decrypted data by decrypting the ciphertext calculation result with the private key fragment, and sending the first intermediate decrypted data to other data providing ends

404 receiving second intermediate decrypted data sent by other data providing ends

405 acquiring the plaintext data by fusing the first intermediate decrypted data with the second intermediate decrypted data

FIG. 4

501 receiving ciphertext data sent by respective data providing ends

502 obtaining a ciphertext calculation result by performing an encryption calculation on respective pieces of ciphertext data with an evaluation public key

503 sending the ciphertext calculation result to respective data providing ends for decryption

FIG. 5

601 receiving encryption public key fragments sent by respective data providing ends

602 acquiring the encryption public key based on the encryption public key fragments

FIG. 6

701 receiving target intermediate results of the evaluation public key sent by respective data providing ends

702 acquiring the evaluation public key based on the target intermediate results

FIG. 7

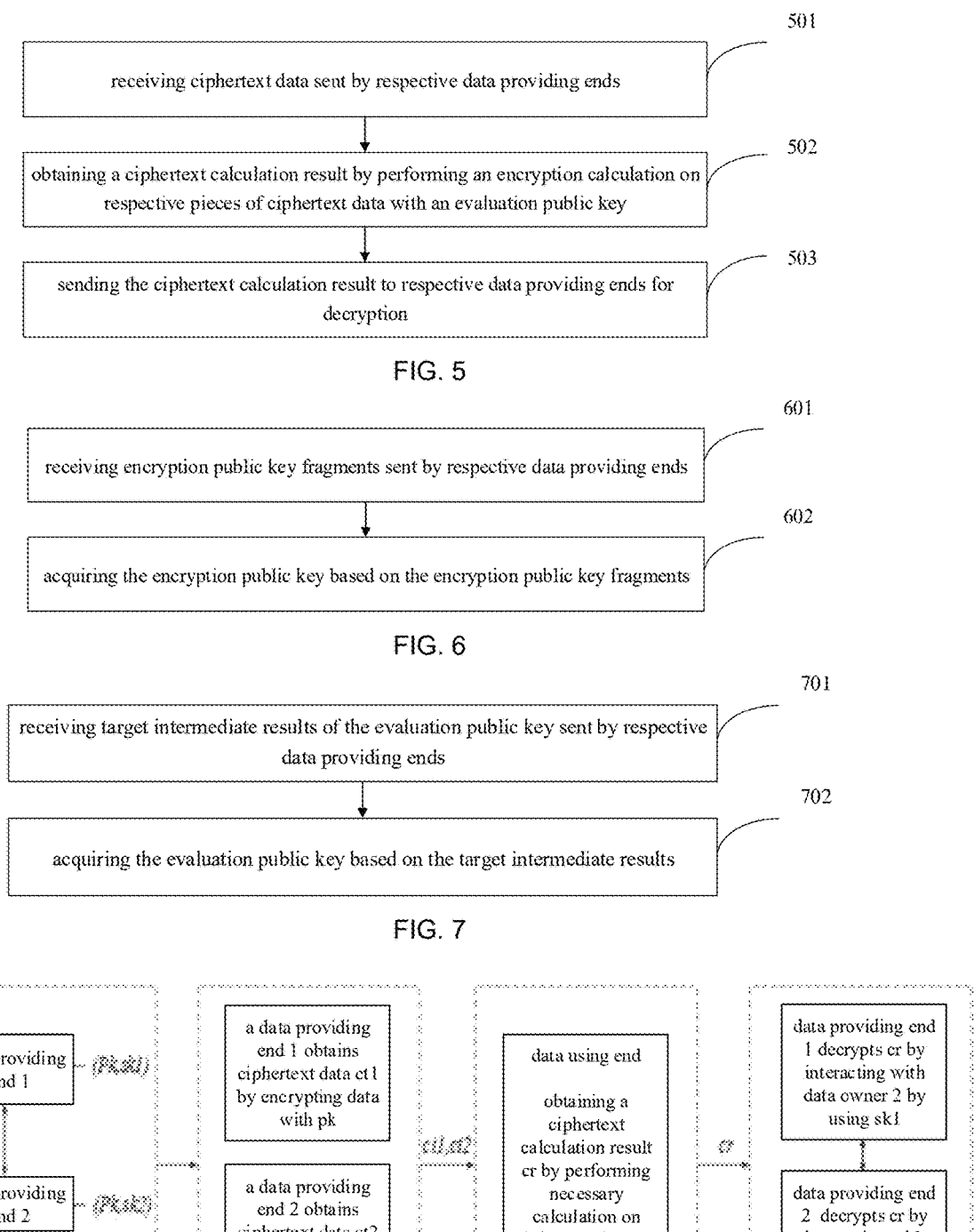

FIG. 8

METHOD OF DATA TRANSMISSION, AND ELECTRONIC DEVICE

CROSS-REFERENCE TO RELATED APPLICATIONS

This application is a US national phase application of International Application No. PCT/CN2022/085190, filed on Apr. 2, 2022, which claims priority to Chinese Patent Application No. 202110368291.X, filed on Apr. 6, 2021, the entire contents of which are incorporated herein by reference.

TECHNICAL FIELD

The present disclosure relates to a field of data processing, and particularly to a method of data transmission, an electronic device and a storage medium.

BACKGROUND

Homomorphic encryption allows to calculate on encrypted ciphertext data, which may protect security of data while using the data. In the related art, the homomorphic encryption only supports to calculate on ciphertext data encrypted by one key, rather than achieving jointly calculation on a plurality of pieces of ciphertext data encrypted by different keys, which limits a use scenario of the homomorphic encryption.

SUMMARY

A method of data transmission is provided in a first aspect of embodiments of the present disclosure. The method is applicable for a data providing end, and includes: generating an encryption public key and an evaluation public key by interacting with other data providing ends; generating ciphertext data by encrypting local data with the encryption public key, and sending the ciphertext data to a data using end; receiving a ciphertext calculation result sent by the data using end, in which the ciphertext calculation result is determined by the data using end based on the evaluation public key and the ciphertext data received; and acquiring plaintext data by decrypting the ciphertext calculation result with a private key fragment of the data providing end.

A method of data transmission is provided in a second aspect of embodiments of the present disclosure. The method is applicable for a data using end, and includes: receiving ciphertext data sent by respective data providing ends; obtaining a ciphertext calculation result by performing an encryption calculation on respective pieces of ciphertext data with an evaluation public key; and sending the ciphertext calculation result to respective data providing ends for decryption.

An electronic device is provided in a third aspect of embodiments of the present disclosure, and includes a processor and a memory;

in which, the processor runs a program corresponding to an executable program code by reading the executable program code stored in the memory to implement: generating an encryption public key and an evaluation public key by interacting with other data providing ends; generating ciphertext data by encrypting local data with the encryption public key, and sending the ciphertext data to a data using end; receiving a ciphertext calculation result sent by the data using end, in which the ciphertext calculation result is determined by the data using end based on the evaluation public key and the ciphertext data received; and acquiring plaintext data by decrypting the ciphertext calculation result with a private key fragment of the data providing end.

Additional aspects and advantages of the present disclosure will be set forth in part in the following description, and in part will become obvious from the following description, or may be learned by practice of the disclosure.

BRIEF DESCRIPTION OF THE DRAWINGS

FIG. 1 is a schematic diagram illustrating an application scenario of a method of data transmission in the present disclosure;

FIG. 2 is a flowchart illustrating a method of data transmission in an embodiment of the present disclosure;

FIG. 3 a flowchart illustrating a method for generating a key in another embodiment of the present disclosure;

FIG. 4 a flowchart illustrating a method of data transmission in another embodiment of the present disclosure;

FIG. 5 a flowchart lustrating a method of data transmission in another embodiment of the present disclosure;

FIG. 6 is a flowchart illustrating a method of data transmission in another embodiment of the present disclosure;

FIG. 7 is a flowchart illustrating a method of data transmission in another embodiment of the present disclosure;

FIG. 8 a schematic diagram illustrating an application of a method of data transmission in an embodiment of the present disclosure;

DETAILED DESCRIPTION

Figure 9:
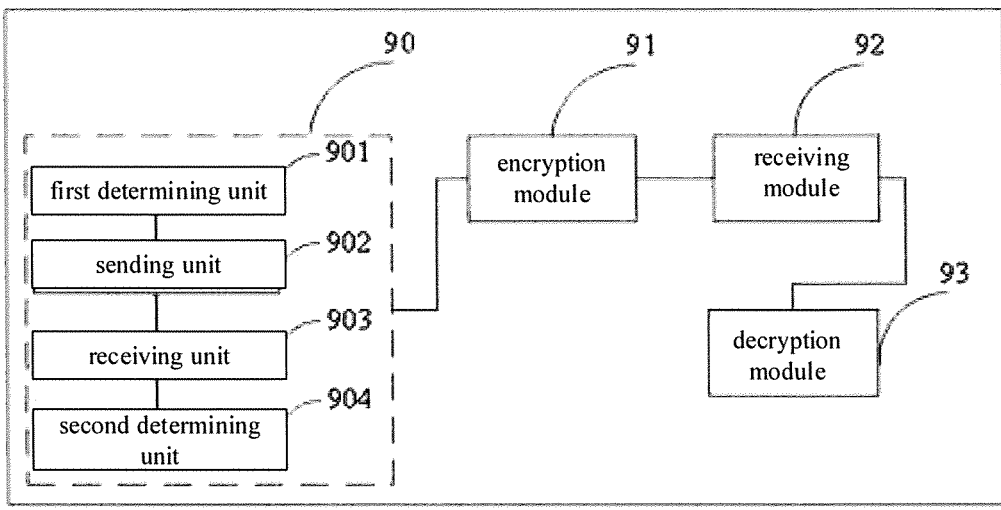
FIG. 9 is a schematic diagram illustrating a structure of an apparatus of data transmission provided in an embodiment of the present disclosure.

Embodiments of the present disclosure are described in detail below, and examples of embodiments are illustrated in the accompanying drawings, in which the same or similar labels represent the same or similar elements or elements with the same or similar functions. The embodiments described below with reference to the drawings are illustrative, are intended to be configured to explain the present disclosure and are not to be construed as a limitation of the present disclosure.

For example, FIG. 1 is a schematic diagram illustrating an application scenario of a method of data transmission in the present disclosure. As illustrated in FIG. 1, an application scenario may include at least one data providing end (FIG. 1 illustrates three data providing ends, including a data providing end 111, a data providing end 112 and a data providing end 113, respectively), a network 12, and a data using end 13. Each of the data providing ends may communicate with the data using end 13 through the network 12. The data providing ends may communicate with each other through the network 12.

It should be noted that FIG. 1 is a schematic diagram of an application scenario provided in an embodiment of the present disclosure, which neither limits the devices included in FIG. 1, nor defines a position relationship between the devices included in FIG. 1. For example, the application scenario illustrated in FIG. 1 may additionally include a data storage device. The data storage device may be an external memory, or an internal memory integrated internally relative to the data providing end and the data using end 13.

The technical solution in the present disclosure is described in specific embodiments below. It should be noted that, the following several specific embodiments may be combined with each other, and same or similar concepts or processes may not be repeated in some embodiments.

FIG. 2 is a flowchart illustrating a method of data transmission in an embodiment of the present disclosure. As illustrated in FIG. 2, an executive subject is a data providing end. The data providing end may be an E-commerce server, a social server, a communication server or other electronic devices that own multi-party data of users.

As illustrated in FIG. 2, the method of data transmission includes the following steps S201 to S204.

At S201, a private key fragment of the data providing end, an encryption public key and an evaluation public key are generated.

In embodiments of the present disclosure, the private key fragment of the data providing end, the encryption public key and the evaluation public key are generated by interactive cooperation between the data providing end and other data providing ends. In some implementations, the data providing end may acquire its own key generation parameters. The key generation parameters include a public parameter and a public random number. Further, the data providing end generates its own private key fragment, as well as an encryption public key fragment and a part of the evaluation public key based on its own key generation parameters, and interacts with other data providing ends to share the encryption public key fragment of the data providing end and a part of the evaluation public key to other data providing ends. Correspondingly, each of other data providing ends may also share its own encryption public key fragment and a part of the evaluation public key. The data providing end may acquire the encryption public key after acquiring the encryption public key fragments of other data providing ends, and similarly acquire the evaluation public key based on parts of the evaluation public key acquired. Other data providing ends may be servers of the same type as the data providing end as the executive subject, or may be other type of servers. Each data providing end participates in calculation of the encryption public key and the evaluation public key, thus constructing a multi-party homomorphic encryption mechanism, capable of achieving a purpose of homomorphic encryption on data of a plurality of data providing ends.

At S202, ciphertext data is generated by encrypting local data with the encryption public key, and sent to a data using end.

When a plurality of data providing ends are required to provide data simultaneously, in order to prevent data at the data providing end from being leaked or stolen, in embodiments of the present disclosure, the data providing end is required to encrypt local data with the encryption public key, and generate one piece of ciphertext data. The data providing end may send the ciphertext data to the data using end after generating the ciphertext data. Correspondingly, the data using end may receive respective pieces of ciphertext data sent by the plurality of data providing ends. The local data of the data providing end is encrypted by the encryption public key, causing that only the data providing end knows its own data, and other data providing ends cannot obtain actual contents of the data. Therefore, each data providing end has higher data security, and data leakage may be avoided.

Continuing taking the scenario of FIG. 1 as an example, the data providing end 111 encrypts local data u1 with the encryption public key to generate ciphertext data ct1, the data providing end 112 encrypts local data u2 with the encryption public key to generate ciphertext data ct2, and the data providing end 113 encrypts local data 113 with the encryption public key to generate ciphertext data ct3. The data using end 13 may receive ciphertext data sent by each data providing end.

At S203, a ciphertext calculation result sent by the data using end is received. The ciphertext calculation result is determined by the data using end based on the evaluation public key and the ciphertext data received.

After receiving the ciphertext data sent by each data providing end, the data using end may generate the ciphertext calculation result by performing encryption calculation on the ciphertext data based on the evaluation public key, and then sent the ciphertext calculation result to each data providing end correspondingly.

Correspondingly, the data providing end may receive the ciphertext calculation result sent by the data using end.

At S204, plaintext data is acquired by decrypting the ciphertext calculation result with the private key fragment.

In embodiments of the present disclosure, in order to ensure data security of each data providing end itself, each of the data providing ends may not directly acquire a complete private key, and each of the data providing ends owns a part of the private key, that is, one piece of private key fragment. The data providing end may acquire the plaintext data by decrypting the ciphertext calculation result with its own private key fragment after receiving the ciphertext calculation result.

According to the method of data transmission provided in embodiments of the present disclosure, constructing a multi-party homomorphic encryption mechanism may achieve a purpose of homomorphic encryption calculation on encrypted data of a plurality of data providing ends, and expand an application scenario of homomorphic encryption. Further, a secure multi-party calculating technology based on the homomorphic encryption is provided to improve data security. Data is transmitted based on a homomorphic encryption algorithm, which may protect the data security of the providing end, further to prevent information leakage of the data providing end. Further, decentralized management is performed on a private key for decryption of the plurality of data providing ends to improve the data security.

On the basis of the above embodiment, in order to achieve encryption and decryption of the data, before the ciphertext data is generated by encrypting the local data with the encryption public key, cooperation between the data providing ends is further required to generate a key. The key includes a public key and a private key. In embodiments of the present disclosure, the public key for encryption includes an encryption public key and an evaluation public key. In embodiments of the present disclosure, a leveled homomorphic encryption (BGV) algorithm based on learning with errors (LWE) is adopted. It should be noted that, a symbol E.PubKeygen(s; A) represents an encryption public key generation algorithm performed based on a fixed coefficient A. A symbol E.PubKeygen(s; A; e) represents an encryption public key generation algorithm performed based on the fixed coefficient A and noise e.

A process of generating a key is introduced below.

FIG. 3 a flowchart illustrating a method for generating a key in another embodiment of the present disclosure. As illustrated in FIG. 3, the executive subject is a data providing end. The process of generating the key includes the following steps S301 to S306.

At S301, a private key fragment of the data providing end is generated.

Each data providing end owns key generation parameters for generating the key, and generates the key based on the key generation parameters. The key generation parameters include a public parameter and a public random number. The public parameter is that params=({params$_d$=($1^\kappa$, q$_d$, m, n, φ, χ)}$_{0 \leq d \leq D}$, B$_\varphi$, B$_\chi$, B$_{eval}$, B$_{enc}$, B$_{dec}$), where params$_d$ denotes a parameter of the leveled BGV algorithm based on LWE, d denotes that a mode of a ciphertext is q$_d$, κ, m, n, φ and χ denote parameters of the foregoing algorithm, where κ is a security parameter, m, n are respectively dimensions, φ and χ respectively denote a key probability distribution and a noise probability distribution. B$_\varphi$, B$_\chi \in$ Z denotes a boundary of the probability distributions φ and χ. |x|≤B$_\varphi$ (or |x|≤B$_\chi$) is checked every time x←φ (or x←χ) is sampled. In response to a condition not being met, re-sampling is performed. B$_{eval}$ denotes a noise boundary of evaluation key calculation, B$_{enc}$ denotes a noise boundary of encryption calculation, and B$_{dec}$ is a noise boundary of decryption calculation.

In some embodiments, the public random number includes:

$$\{A_d \xleftarrow{\$} Z_{q_d}^{m \times n}\}_{d \in \{0, \ldots, D\}},$$

$$\left\{ d_{d,i,\tau}^k \xleftarrow{\$} Z_{q_d}^n : \begin{array}{l} k \in [N], i \in [n] \\ d \in [D], \tau \in \{0, \ldots, \lfloor \log(q_d) \rfloor\} \end{array} \right\},$$

where d∈ {0, . . . , D}; i∈[n], [n] denotes a set of all integers from 1 to n, τ∈ {0, . . . , $\lfloor$log q$_d$$\rfloor$}; N denotes a number of the data providing ends, D denotes the leveled BGV algorithm based on LWE, and supports a maximum multiplication level of a circuit.

Further, the data providing end may generate its own private key fragment based on the key generation parameters and a private key generation algorithm after acquiring the key generation parameters. The private key generation algorithm is E.SymKeygen (params), and the public parameter in the key generation parameters is input into the private key generation algorithm, so that the private key fragment corresponding to the data providing end may be output.

A data providing end P$_k$ generates its own private key fragment s$_d^k$ based on the public parameter in the key generation parameters. P$_k$ first calls a private key generation algorithm of the leveled BGV algorithm based on LWE, to generate s$_d^k$←E.SymKeygen(params$_d$) for each d∈ {0, . . . , D}.

At S302, an encryption public key fragment of the data providing end is generated based on the private key fragment.

Further, the data providing end may generate the encryption public key fragment of the data providing end itself based on the private key fragment, the public random number and an encryption public key generation algorithm after acquiring the private key fragment. The encryption public key generation algorithm is E.PubKeygen(s). Further, the private key fragment and the public random number are input into the encryption public key generation algorithm, to output the encryption public key fragment corresponding to the data providing end itself.

The data providing end P$_k$ generates its own encryption public key fragment (A$_d$, p$_d^k$) based on the private key fragment and the public random number in the key generation parameters. P$_k$ first calls an encryption public key generation algorithm of the leveled BGV algorithm based on LWE, to generate (A$_d$, p$_d^k$)←E.PubKengen(s$_d^k$; A$_d$) for each d∈ {0, . . . , D}, where p$_d^k$=A$_d$·s$_d^k$+2·e$_d^k$.

At S303, a target intermediate result corresponding to the evaluation public key is generated based on the private key fragment.

The data providing end may generate a first intermediate result of the evaluation public key corresponding to the data providing end based on the private key fragment, the public random number, and an evaluation public key generation algorithm after acquiring the private key fragment. The evaluation public key generation algorithm is E.symEnc(s). Further, the private key fragment and the public random number are input into the evaluation public key generation algorithm, to output the first intermediate result of the evaluation public key corresponding to the data providing end.

The data providing end P$_k$ generates a first intermediate result {b$_{d,i,\tau}^{l,k}$}$_{l,d,i,\tau}$ of the evaluation public key based on the private key fragment and the public random number in the key generation parameters. P$_k$ first calls the evaluation public key generation algorithm to calculate as follows for each d∈ {0, . . . , D}, i∈[n], [n] denotes a set of all integers from 1 to n, τ∈ {0, . . . , $\lfloor$log q$_d$$\rfloor$};

$$(a_{d,i,\tau}^k, b_{d,i,\tau}^{k,k}) \leftarrow E.SymEnc_{s_d^k}(2^\tau \cdot s_{d-1}^k[i]; a_{d,i,\tau}^k),$$

where, b$_{d,i,\tau}^{k,k}$=$\left\langle a_{d,i,\tau}^k, s_d^k \right\rangle$+2e$_{d,i,\tau}^{k,k}$+2$^\tau$·s$_{d-1}^k$[i]; s$_{d-1}^k$[i] denotes an i-th component denoted by s$_{d-1}^k$.

In addition, for each d, i, τ, and each l∈ [N]−{k}, the data providing end P$_k$ calculates that (a$_{d,i,\tau}^l$, b$_{d,i,\tau}^{l,k}$)←E.SymEnc$_{s_d^k}$(0; a$_{d,i,\tau}^l$), where b$_{d,i,\tau}^{l,k}$=$\left\langle a_{d,i,\tau}^l, s_d^k \right\rangle$+2e$_{d,i,\tau}^{l,k}$.

After acquiring the first intermediate result of the evaluation public key, the data providing end may send its own first intermediate result to other data providing ends. For example, the data providing end may broadcast its own first intermediate result. Similarly, other data providing ends may broadcast respective first intermediate results. Correspondingly, the data providing end may receive respective first intermediate results broadcast by other data providing ends. After acquiring the first intermediate results of other data providing ends, the data providing end may further obtain a second intermediate result of the evaluation public key in combination with the first intermediate result of the data providing end itself.

The data providing end P$_k$ may calculate a second intermediate result β$_{d,i,\tau}^l$ when obtaining {b$_{d,i,\tau}^{l,k}$}$_{l,d,i,\tau}$. P$_k$ may calculate the second intermediate result based on β$_{d,i,\tau}^l$:=Σ$_{l=1}^N$b$_{d,i,\tau}^{l,k}$. In case of all data owners complying with a protocol, an operation may be performed as follows: (a$_{d,i,\tau}^l$, β$_{d,i,\tau}^l$)←E.SymEnc$_{s^*}$(2$^\tau$·s$_{d-1}^l$[i]; a$_{d,i,\tau}^l$; e), where e=Σ$_{l=1}^N$e$_{d,i,\tau}^{l,k}$. In an implementation, the evaluation public key is E.SymEnc$_{s^*}$(2$^\tau$·s$^*_{d-1}$[i]·s$^*_{d-1}$[j]), and the calculated second intermediate result (a$_{d,i,\tau}^l$, β$_{d,i,\tau}^l$) has been approximate to the evaluation public key.

Further, the data providing end may acquire a target intermediate result (α$_{d,i,j,\tau}^{l,k}$, β$_{d,i,j,\tau}^{l,k}$) of the evaluation public key based on the private key fragment, the public random number in the key generation parameters and the second intermediate result after acquiring the second intermediate result.

After acquiring the second intermediate result $\beta_{d,i,\tau}^{l}$, and performs the above operation for each $l \in [N]$, $d \in [D]$, i, $j \in [n]$, $\tau \in \{0, \ldots, \lfloor \log q_d \rfloor\}$, the data providing end $P_k$ performs operations that $(v_{d,i,j,\tau}^{l,k}, w_{d,i,j,\tau}^{l,k}) \leftarrow E.PubEnc_{p^*_d}(0)$, $e \leftarrow^{\$}[-B_{eval}, B_{eval}]$ and $(\alpha_{d,i,j,\tau}^{l,k}, \beta_{d,i,j,\tau}^{l,k}) := s_{d-1}^{k}[j] \cdot (a_{d,i,\tau}^{l}, \beta_{d,i,\tau}^{l}) + (v_{d,i,j,\tau}^{l,k}, w_{d,i,j,\tau}^{l,k} + 2e)$. After performing the foregoing operations, the target intermediate result $(\alpha_{d,i,j,\tau}^{l,k}, \beta_{d,i,j,\tau}^{l,k})$ corresponding to the evaluation public key may be more approximate to $2^{\tau} \cdot s_{d-1}^{l}[i] \cdot s_{d-1}^{k}[j]$, which is more closer to the evaluation public key.

At S304, the encryption public key fragment and the target intermediate result corresponding to the evaluation public key are broadcast.

At S305, encryption public key fragments and target intermediate results sent by other data providing ends are received respectively.

At S306, the encryption public key is generated based on respective encryption public key fragments, and the evaluation public key is generated based on respective target intermediate results.

The specific processings of steps S304 to S306 are introduced below.

In embodiments of the present disclosure, the data providing end may send the encryption public key fragment of the data providing end itself to other data providing ends after acquiring encryption public key fragment of the data providing end itself. For example, the data providing end may broadcast its own encryption public key fragment. Similarly, other data providing ends may broadcast respective encryption public key fragments. Correspondingly, the data providing end may receive the encryption public key fragments respectively broadcast by other data providing ends. After acquiring the encryption public key fragments of other data providing ends, the encryption public key may be resumed in combination with the encryption public key fragment of the data providing end itself.

The data providing end $P_k$ acquires $\{p_d^{k}\}_d$, where $\{p_d^{k}\}_d$ is configured to denote a set of encryption public key fragments of all data providing ends. $P_k$ may calculate an encryption public key $pk := (A_0, p^*_0)$ after acquiring the set. $P_k$ may calculate the encryption public key based on $p^*_d := \sum_{l=1}^{N} p_d^{l}$.

In a process of homomorphic encryption, in response to each of the data providing ends following a protocol, that is, each of the data providing ends is a trusted data provider, the encryption public key generation algorithm is $(A_d, p^*_d) = E.PubKeygen(s^*_d; A_d; e^*_d)$, where $p^*_d = A_d \cdot s^*_d + 2 \cdot e^*_d$, $s^*_d := \sum_{l=1}^{N} s_d^{l}$, $e^*_d := \sum_{l=1}^{N} e_d^{l}$, where $l \in [N]$, $d \in [D]$.

Further, the data providing end may send the target intermediate result to other data providing ends after acquiring the target intermediate result of the evaluation public key. For example, the data providing end may broadcast its own target intermediate result. Similarly, other data providing ends may broadcast respective target intermediate results. Correspondingly, the data providing end may receive respective target intermediate results broadcast by other data providing ends. After acquiring the target intermediate results of other data providing ends, the evaluation public key may be resumed in combination with the target intermediate result of the data providing end itself.

The data providing end $P_k$ has an input setup, $\beta_{d,i,\tau}^{l}$, $(\alpha_{d,i,j,\tau}^{l,k}, \beta_{d,i,j,\tau}^{l,k})$, to calculate and output an evaluation key $\varphi_{d,i,j,\tau}$. For each $l \in [N]$, $d \in [D]$, $i \in [n]$, $j \in [n] \cup \{0\}$,

8

$\tau \in \{0, \ldots, \lfloor \log q_d \rfloor\}$, $P_k$ may perform the following calculation to calculate the evaluation public key by the following formula:

$$\varphi_{d,i,j,\tau} := \begin{cases} \sum_{l=1}^{N} \sum_{k=1}^{N} (\alpha_{d,i,j,\tau}^{l,k}, \beta_{d,i,j,\tau}^{l,k}) & j \neq 0 \\ \sum_{l=1}^{N} (a_{d,i,\tau}^{l}, \beta_{d,i,\tau}^{l}), & j = 0 \end{cases}$$

Correspondingly, the data using end may receive an encryption public key fragment broadcast by each data providing end, and may acquire a complete encryption public key in a similar manner. The data using end may calculate the evaluation public key by using a calculation formula of the evaluation public key.

The data providing end calls an encryption algorithm after acquiring the encryption public key, in which the encryption algorithm is $E.PubEnc_{pk}(\mu)$, and obtain the ciphertext data by encrypting its own data by using the encryption algorithm. For example, the data providing end $P_k$ calculates $(v, w) \leftarrow E.Enc_{pk}(\mu)$ by calling the encryption algorithm, to finally acquire the ciphertext data $c_k = ((v, w+2e), 0)$, where 0 indicates that a multiplication level is 0, $e \leftarrow^{\$}[-B_{enc}, B_{enc}]$.

The data using end obtains a ciphertext calculation result by encrypting the ciphertext data sent by each of the data providing ends with the evaluation public key after acquiring the evaluation public key.

The data using end may calculate the ciphertext calculation result by encrypting each piece of ciphertext data based on the evaluation public key by calling an $Eval_{evk}$ encryption algorithm, that is, $Eval_{evk}(f, c_1, \ldots, c_l)$. The evaluation algorithm $Eval_{evk}(f, c_1, c_l)$ is same as $E.Eval_{evk}(f, c_1, \ldots, c_l)$.

In a process of generating the key provided in embodiments of the present disclosure, two rounds of protocol are performed between N data providing ends, the input is setup and the outputs are an evaluation public key $evk = \{\varphi_{d,i,j,\tau}\}_{d,i,j,\tau}$ and an encryption public key $pk = (A_0, p^*_0)$, and each data owner obtains a private key part $s_D^{k}$. In embodiments of the present disclosure, the encrypted data may be further encrypted based on the evaluation public key, thus ensuring security of data transmission better. Moreover, decentralized management is performed on private keys for decryption of a plurality of data providing ends, to improve data security.

On the basis of the above embodiment, the data providing end may decrypt the ciphertext calculation result received with its own private key fragment $s_D^{k}$ after acquiring the ciphertext calculation result. FIG. 4 is a flowchart illustrating a method of data transmission in another embodiment of the present disclosure. As illustrated in FIG. 4, an executive subject is a data providing end. The method of data transmission includes the following steps S400 to S405.

At S400, a private key fragment of the data providing end, as well as an encryption public key and an evaluation public key are generated.

At S401, ciphertext data is generated by encrypting local data with the encryption public key, and sent to a data using end.

At S402, a ciphertext calculation result sent by the data using end is received. The ciphertext calculation result is determined by the data using end based on the evaluation public key and the ciphertext data received.

The descriptions of steps S400 to S402 may refer to a record of relevant contents in the above embodiments, which will not be repeated here.

At S403, first intermediate decrypted data is obtained by decrypting the ciphertext calculation result with the private key fragment, and sent to other data providing ends.

In embodiments of the present disclosure, since the data providing end only has a part of the private key and cannot completely decrypt the ciphertext calculation result, the first intermediate decrypted data may be obtained after the ciphertext calculation result is decrypted. After the first intermediate decrypted data is obtained, in order to completely decrypt data, the data providing end is required to send the first intermediate decrypted data to other data providing ends, so that each of other data providing ends may acquire its own first intermediate decrypted data to decrypt plaintext data.

In some embodiments, the data providing end may broadcast the first intermediate decrypted data, and other data providing ends may monitor the first intermediate decrypted data. In some embodiments, the data providing end may directly send the first intermediate decrypted data to other data providing ends. It is only illustrative herein, and the method for sending the first intermediate decrypted data in embodiments of the present disclosure may be selected based on actual requirements.

The data providing end $P_k$ calculates first intermediate decrypted data $w^k = \langle v, s_D^k \rangle + 2e_k$ by decrypting the received ciphertext calculation result with its own private key fragment $s_D^k$, where $e_k \leftarrow^{\$} [-B_{dec}, B_{dec}]$. Then, $P_k$ broadcasts the first intermediate decrypted data $w^k$.

At S404, second intermediate decrypted data sent by other data providing ends is received.

In embodiments of the present disclosure, a role of each data providing end is same. Each of other data providing ends may also decrypt the received ciphertext calculation result with its own private key fragment, to obtain one piece of intermediate decrypted data. It should be noted that, the intermediate decrypted data decrypted by each of other data providing ends with its own private key fragment is referred to as second intermediate decrypted data in order to distinguish. Similarly, each of other data providing ends may send the second intermediate decrypted data out after obtaining the second intermediate decrypted data. In some embodiments, each of other data providing ends may broadcast its own second intermediate decrypted data, and the data providing end may monitor the second intermediate decrypted data.

At S405, plaintext data is acquired by fusing the first intermediate decrypted data with the second intermediate decrypted data.

Decrypting a secret may be required to acquire enough pieces of secret fragments based on a secret sharing mechanism. In embodiments of the present disclosure, the data providing ends may share with each other the intermediate decrypted data that has been decrypted, to ensure that each data providing end may acquire enough pieces of intermediate decrypted data to further obtain the plaintext data by decrypting. In embodiments of the present disclosure, the data providing end may receive the ciphertext calculation result sent by the data using end which is a multiplication level. The data providing end may acquire the plaintext data by fusing the first intermediate decrypted data with the second intermediate decrypted data, for example, by performing a homomorphic addition or multiplication on the first intermediate decrypted data and the second intermediate decrypted data.

The data providing end may acquire the second intermediate decrypted data sent by other data providing ends, and fuse the first intermediate decrypted data with the second intermediate decrypted data based on the following formula: $\Sigma_{i=1}^{N} w^i$. Further, plaintext data may be acquired by decrypting based on a formula $\mu = [w - \Sigma_{i=1}^{N} w^i]_{q_D} \mod 2$.

According to the method of data transmission provided in embodiments of the present disclosure, constructing a multi-party homomorphic encryption mechanism may achieve a purpose of homomorphic encryption calculation on encrypted data of a plurality of data providing ends, and expand an application scenario of homomorphic encryption. Further, a secure multi-party calculating technology based on the homomorphic encryption is provided to improve data security. Data is transmitted based on a homomorphic encryption algorithm, which may protect the data security of the data providing end, further to prevent information leakage of the data providing end. Further, decentralized management is performed on a private key for decryption of the plurality of data providing ends to improve the data security.

FIG. 5 is a flowchart illustrating a method of data transmission in another embodiment of the present disclosure. As illustrated in FIG. 5, an executive subject is a data using end. The method of data transmission includes the following steps S501 to S503.

At S501, ciphertext data sent by respective data providing ends is received.

When a plurality of data providing ends are required to provide data simultaneously, in order to prevent data at the data providing end from being leaked or stolen, in embodiments of the present disclosure, the data providing end is required to encrypt local data with the encryption public key, and generate one piece of ciphertext data. The data providing end may send the ciphertext data to the data using end after generating the ciphertext data. Correspondingly, the data using end may receive respective pieces of ciphertext data sent by the plurality of data providing ends.

At S502, a ciphertext calculation result is obtained by performing an encryption calculation on respective pieces of ciphertext data with an evaluation public key.

After receiving the ciphertext data sent by respective data providing ends, the data using end may call an encryption algorithm for all pieces of ciphertext data, and generate the ciphertext calculation result by performing the encryption calculation on respective pieces of ciphertext data with the evaluation public key and sent the ciphertext calculation result to the data providing ends respectively. For example, the data using end may calculate the ciphertext calculation result by encrypting each piece of ciphertext data based on the evaluation public key by calling an $\text{Eval}_{evk}$ encryption algorithm, that is, $\text{Eval}_{evk}(f, c_1, \ldots, c_l)$. The evaluation algorithm $\text{Eval}_{evk}(f, c_1, \ldots, c_l)$ is same as $E.\text{Eval}_{evk}(f, c_1, \ldots, c_l)$.

At S503, the ciphertext calculation result is sent to respective data providing ends for decryption.

After acquiring the ciphertext calculation result, the data using end may send the ciphertext calculation result to each data providing end, and the data providing end may acquire plaintext data by decrypting the ciphertext calculation result. In embodiments of the present disclosure, in order to ensure data security of each data providing end itself, each of the data providing ends may not directly acquire a complete private key, and each of the data providing ends owns a part of a private key, that is, one piece of private key fragment. The data providing end may acquire the plaintext data by decrypting the ciphertext calculation result with its own private key fragment after receiving the ciphertext calculation result.

According to the method for data transmission provided in embodiments of the present disclosure, constructing a multi-party homomorphic encryption mechanism may achieve a purpose of homomorphic encryption calculation on encrypted data of a plurality of data providing ends, and expand an application scenario of homomorphic encryption. Further, a secure multi-party calculating technology based on the homomorphic encryption is provided, to improve data security. Data is transmitted based on the homomorphic encryption algorithm, which may protect the data security of the data providing end, further to prevent information leakage of the data providing end. Further, decentralized management is performed on a private key for decryption of the plurality of data providing ends to improve the data security.

On the basis of the above embodiments, in order to achieve encryption and decryption of the data, before the ciphertext data sent by respective data providing ends is received, cooperation between the data providing ends is also required to generate an encryption public key and an evaluation public key. FIG. 6 is a flowchart illustrating a method of data transmission in another embodiment of the present disclosure. As illustrated in FIG. 6, an executive subject is a data using end. The method of data transmission includes the following steps S601 to S602.

At S601, encryption public key fragments sent by respective data providing ends are received.

In embodiments of the present disclosure, each of the data providing ends may generate an encryption public key fragment first, and broadcast the encryption public key fragment to the data using end. Correspondingly, the data using end may receive the encryption public key fragment broadcast by each of the data providing ends. The calculation process during which the data providing end generates the encryption public key fragment may refer to a record of relevant contents in the above embodiments, which will not be repeated here.

At S602, the encryption public key is acquired based on the encryption public key fragments.

After the encryption public key fragments of respective data providing ends are acquired, the encryption public key may be obtained by adding the encryption public key fragments. In some embodiments, an encryption public key generation algorithm is $(A_d, p^*_d)=E.PubKeygen(s^*_d; A_d; e^*_d)$, where $p^*_d=A_d \cdot s^*_d+2 \cdot e^*_d$, $s^*_d:=\Sigma_{l=1}^N s_d^l$, $e^*_d:=\Sigma_{l=1}^N e_d^l$, where $l \in [N]$, $d \in [D]$.

FIG. 7 is a flowchart illustrating a method of data transmission in another embodiment of the present disclosure. As illustrated in FIG. 7, an executive subject is a data using end. The method of data transmission includes the following steps S701 to S702.

At S701, target intermediate results of the evaluation public key sent by respective data providing ends are received.

In embodiments of the present disclosure, each of the data providing ends may generate a target intermediate result of the encryption public key first, and broadcast the target intermediate result to the data using end. Correspondingly, the data using end may receive the target intermediate result sent by each of the data providing ends. The calculation process during which the data providing end generates the target intermediate result may refer to a record of relevant contents in the above embodiments, which will not be repeated here.

At S702, an evaluation public key is acquired based on the target intermediate results of the data providing ends.

When the target intermediate results of respective data providing ends is acquired, the evaluation public key may be obtained by calculating the target intermediate results.

The data using end has an input setup, $\beta_{d,i,\tau}^l$, $(\alpha_{d,i,j,\tau}^{l,k}, \beta_{d,i,j,\tau}^{l,k})$, and calculates and outputs an evaluation key $\varphi_{d,i,j,\tau}$. For each $l \in [N]$, $d \in [D]$, $i \in [n]$, $j \in [n] \cup \{0\}$, $\tau \in \{0, \ldots, \lfloor \log q_d \rfloor\}$, the evaluation public key may be calculated by the following formula:

$$\varphi_{d,i,j,\tau} := \begin{cases} \sum_{l=1}^N \sum_{k=1}^N (\alpha_{d,i,j,\tau}^{l,k}, \beta_{d,i,j,\tau}^{l,k}) & j \neq 0 \\ \sum_{l=1}^N (a_{d,i,\tau}^l, \beta_{d,i,\tau}^l), & j = 0 \end{cases}$$

The data using end may obtain a ciphertext calculation result by performing an encryption calculation on the ciphertext data sent by each of the data providing ends with the evaluation public key after acquiring the evaluation public key.

The method of data transmission provided in the present disclosure is explained below in combination with an application scenario having two data providing ends. As illustrated in FIG. 8, a data transmission process may be divided into four stages.

A first stage is a key generation stage:

Interactive cooperation between two data providing ends is performed to generate an encryption public key, such as $p_k$ in FIG. 8. Meanwhile, each data providing end has a part of a private key corresponding to a public key, such as, in FIG. 8, a No.1 data providing end having $s_{k1}$, and a No. 2 data providing end having $s_{k2}$. Each data providing end cannot obtain any information of a private key part of another data owner and any information of the private key.

A second stage is a data encryption stage:

Each data providing end generates ciphertext data by encrypting its own data with an encryption public key, for example, $c_{t1}$ and $c_{t2}$ in FIG. 8. Each data providing end sends the ciphertext data to the data using end.

A third stage is a ciphertext calculation stage:

The data using end obtains a ciphertext calculation result by performing an encryption calculation on respective pieces of ciphertext data with an evaluation key, for example, $c_r$ in FIG. 8. The data using end sends the ciphertext calculation result to all data providing ends.

A fourth stage is a ciphertext calculation result decryption stage:

The interactive cooperation is performed between the data providing ends, and a plaintext calculation result is obtained by jointly decrypting the ciphertext calculation result with its own private key part of each of the data providing ends.

Symbols in a homomorphic encryption algorithm in the above embodiments are explained and agreed below.

E denotes a leveled BGV algorithm based on LWE, a supported maximum multiplication level of a circuit is D, and a plaintext space is $\{0, 1\}$. TFHE denotes a threshold homomorphic encryption. Assuming that there are N data owners and one data user. A vector is represented by a bold lower case letter, and a scalar is represented by a lower case letter. When s is a vector, s[i] represents an i-th component of s, agreeing that s[0]=1. Assuming that $\mathcal{D}$ denotes a probability distribution on a finite set S, $x \leftarrow \mathcal{D}$ denotes that x is sampling of $\mathcal{D}$, and $x \leftarrow^\$ S$ denotes that x is uniformly distributed sampling on S. Bases of all logarithms are 2. When n is a positive integer, [n] denotes a set of all integers from 1 to N.

E includes the following basic components:

1) params=$(1^\kappa, q, m, n, \varphi, \chi)$ where params are implicit inputs of all algorithms, $\kappa$ is a security parameter, $q$ is an odd mode, $m$ and $n$ are dimensions, $\varphi$ and $\varphi$ are probability distributions on $\mathbb{R}_q$;

2) E.SymKeygen(params): a private key $s \leftarrow \varphi^n$ is generated;

3) E.PubKeygen(s): $A \leftarrow^s \mathbb{R}_q^{m \times n}$, $e \leftarrow \chi^m$ are generated, and $p:=A \cdot s + 2 \cdot e$ is set, and a public key $pk:=(A,p)$ corresponding to a private key $s$ is output;

4) E.SymEnc$_s(\mu)$: $\mu \in \{0,1\}$ is to be encrypted, $a \leftarrow \mathbb{R}_q^n$, $e \leftarrow \chi$ are selected, and $b:=\langle a, s \rangle + 2 \cdot e + \mu$ is set, a ciphertext $c=(a,b)$ is output;

5) E.PubEnc$_{pk}(\mu)$: $\mu \in \{0, 1\}$ is to be encrypted with a public key $pk=(A,p)$, $r \leftarrow \{0, 1\}^m$ is selected, and $a:=r^T \cdot A$, $b:=\langle r, p \rangle + \mu$ are set, a ciphertext $c=(a,b)$ is output;

6) $c=(a,b)$ is decrypted to output a plaintext $[b - \langle a, s \rangle]_q \mod 2$;

7) A function $f$ is calculated by using an evaluation key evk based on an evaluation algorithm E.Eval$_{evk}(f, c_1, \ldots, c_l)$, $f: \{0, 1\}^l \rightarrow \{0, 1\}$ denotes a Boolean circuit with an input of $l$ pieces of ciphertext $c_1, \ldots, c_l$, and an output of a ciphertext result $c_f$.

E.PubKeygen(s; A) denotes a public key generation algorithm performed by using a fixed coefficient A. PubKeygen (s; A; e) denotes a public key generation algorithm denotes by using the fixed coefficient A and a noise e. E.SymEnc$_s(\mu;$ a) denotes encrypting $\mu$ with a fixed coefficient a and a private key s. E.SymEnc$_s(\mu;$ a; e) denotes encrypting $\mu$ with the fixed coefficient a, the noise e and a private key s.

FIG. 9 is a diagram illustrating a structure of an apparatus of data transmission provided in an embodiment of the present disclosure. As illustrated in FIG. 9, the apparatus of data transmission is applicable for a data providing end, and includes a key generation module 90, an encryption module 91, a receiving module 92 and a decryption module 93.

The key generation module 90 is configured to generate a private key fragment of the data providing end, an encryption public key and an evaluation public key.

The encryption module 91 is configured to generate ciphertext data by encrypting local data with the encryption public key, and sending the ciphertext data to a data using end.

The receiving module 92 is configured to receive a ciphertext calculation result sent by the data using end. The ciphertext calculation result is determined by the data using end based on the evaluation public key and the ciphertext data received.

The decryption module 93 is configured to acquire plaintext data by decrypting the ciphertext calculation result with the private key fragment.

In some embodiments, the decryption module 93 is configured to obtain first intermediate decrypted data by decrypting the ciphertext calculation result with the private key fragment, and send the first intermediate decrypted data to other data providing ends; receive second intermediate decrypted data sent by other data providing ends; and acquire the plaintext data by fusing the first intermediate decrypted data with the second intermediate decrypted data.

In some embodiments, the key generation module 90 includes a first generation unit 901, a sending unit 902, a receiving unit 903 and a second generation unit 904.

The first generation unit 901 is configured to generate the private key fragment of the data providing end, and generate an encryption public key fragment of the data providing end and a target intermediate result corresponding to the evaluation public key based on the private key fragment.

The sending unit 902 is configured to broadcast the encryption public key fragment and the target intermediate result.

The receiving unit 903 is configured to receive encryption public key fragments and target intermediate results sent by other data providing ends respectively.

The second generation unit 904 is configured to generate the encryption public key based on respective encryption public key fragments, and generate the evaluation public key based on respective target intermediate results.

In some embodiments, the first generation unit 901 is further configured to: acquire key generation parameters, in which the key generation parameters includes a public parameter and a public random number; and acquire the private key fragment based on the public parameter and a private key generation algorithm; generate the encryption public key fragment based on the private key fragment, the public random number and an encryption public key generation algorithm; and generate the target intermediate result based on the private key fragment and an evaluation public key generation algorithm.

In some embodiments, the first generation unit 901 is further configured to: generate a first intermediate result of the evaluation public key based on the private key fragment, the public random number and the evaluation public key generation algorithm, and broadcast the first intermediate result; receive respective first intermediate results sent by other data providing ends; acquire a second intermediate result of the evaluation public key based on the first intermediate result of the data providing end and the first intermediate results of other data providing ends; and acquire the target intermediate result of the evaluation public key based on the private key fragment, the public random number and the second intermediate result, and broadcast the target intermediate result.

According to the apparatus of data transmission provided in embodiments of the present disclosure, constructing a multi-party homomorphic encryption mechanism may achieve a purpose of homomorphic encryption calculation on encrypted data of a plurality of data providing ends, and expand an application scenario of homomorphic encryption. Further, a secure multi-party calculating technology based on the homomorphic encryption is provided to improve data security. Data is transmitted based on a homomorphic encryption algorithm, which may protect the data security of the data providing end, further to prevent information leakage of the data providing end. Further, decentralized management is performed on a private key for decryption of the plurality of data providing ends to improve the data security.

It needs to be noted that, the foregoing explanation of embodiments of the method for data transmission is also applicable to the apparatus for data transmission in the embodiment, which will not be repeated here.

Figure 10:
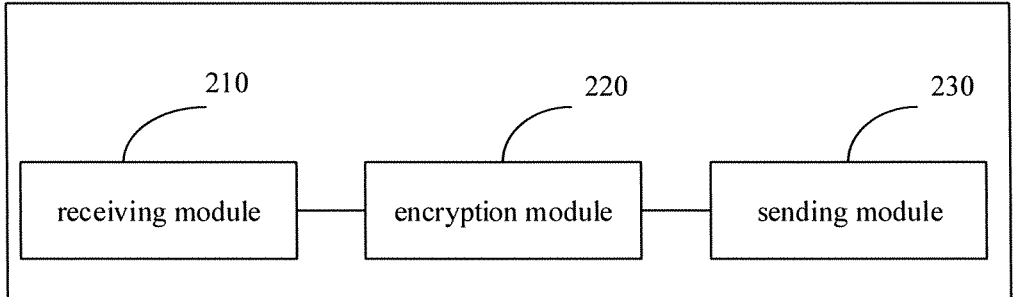
FIG. 10 is a schematic diagram illustrating a structure of an apparatus of data transmission provided in another embodiment of the present disclosure.

FIG. 10 is a diagram illustrating a structure of an apparatus of data transmission provided in another embodiment of the present disclosure. As illustrated in FIG. 10, the apparatus if data transmission is applicable for a data using end, and includes a receiving module 210, an encryption module 220 and a sending module 230.

The receiving module 210 is configured to receive ciphertext data sent by respective data providing ends.

The encryption module 220 is configured to obtain a ciphertext calculation result by performing an encryption calculation on respective pieces of ciphertext data with an evaluation public key.

The sending module 230 is configured to send the ciphertext calculation result to respective data providing ends for decryption.

According to the apparatus of data transmission provided in embodiments of the present disclosure, constructing a multi-party homomorphic encryption mechanism may achieve a purpose of homomorphic encryption calculation on encrypted data of a plurality of data providing ends, and expand an application scenario of homomorphic encryption. Further, a secure multi-party calculating technology based on the homomorphic encryption is provided to improve data security. Data is transmitted based on a homomorphic encryption algorithm, which may protect the data security of the data providing end, further to prevent information leakage of the data providing end. Further, decentralized management is performed on a private key for decryption of the plurality of data providing ends to improve the data security.

Figure 11:
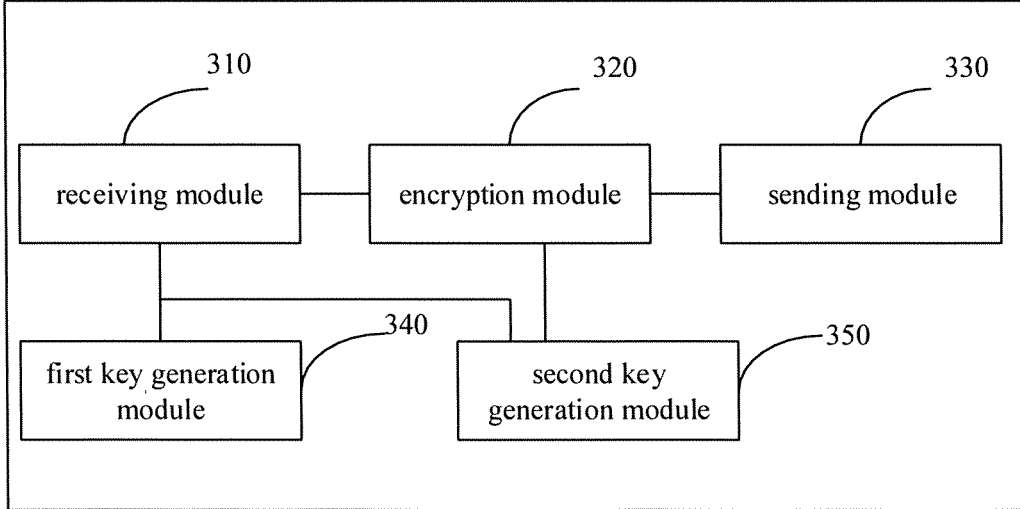
FIG. 11 is a schematic diagram illustrating a structure of an apparatus of data transmission provided in another embodiment of the present disclosure.
Figure 12:
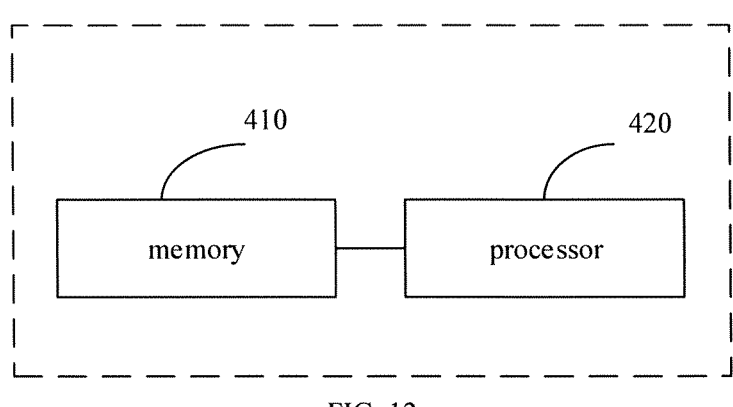
FIG. 12 a schematic diagram illustrating a structure of an electronic device in an embodiment of the present disclosure.

FIG. 11 is a diagram illustrating a structure of an apparatus of data transmission provided in another embodiment of the present disclosure. As illustrated in FIG. 11, the apparatus of data transmission is applicable for a data using end, and includes a receiving module 310, an encryption module 320 and a sending module 330, and a first key generation module 340 and a second key generation module 350.

The function and the structure implemented by the receiving module 310, the encryption module 320 and the sending module 330 are similar with that of the receiving module 210, the encryption module 220 and the sending module 230 in FIG. 10, which will not be repeated here.

The first key generation module 340 is configured to receive encryption public key fragments sent by respective data providing ends, and acquire the encryption public key based on the encryption public key fragments.

The second key generation module 350 is configured to receive target intermediate results of the evaluation public key sent by respective data providing ends, and acquire the evaluation public key based on the target intermediate results.

According to the apparatus of data transmission provided in embodiments of the present disclosure, constructing a multi-party homomorphic encryption mechanism may achieve a purpose of homomorphic encryption calculation on encrypted data of a plurality of data providing ends, and expand an application scenario of homomorphic encryption. Further, a secure multi-party calculating technology based on the homomorphic encryption is provided to improve data security. Data is transmitted based on a homomorphic encryption algorithm, which may protect the data security of the data providing end, further to prevent information leakage of the data providing end. Further, decentralized management is performed on a private key for decryption of the plurality of data providing ends to improve the data security.

It needs to be noted that, the foregoing explanation of embodiments of the method for data transmission is also applicable to the apparatus for data transmission in the embodiment, which will not be repeated here.

To achieve the above embodiments, an electronic device is further provided in the present disclosure, and includes a memory 410 and a processor 420; the processor 420 runs a program corresponding to an executable program code by reading the executable program code stored in the memory 410 to implement the method for data transmission provided in the above embodiment.

In order to achieve the above purpose, present further provides a computer-readable storage medium with a computer program stored thereon is further provided in the present disclosure. The program implements the method for data transmission provided in the above embodiment of the present disclosure when performed by a processor.

In order to achieve the above embodiment, a computer program product is provided in the present disclosure. Instructions in the computer program are configured to implement the method for data transmission described in the above embodiment when executed by a processor.

In descriptions of the specification, descriptions with reference to terms "one embodiment", "some embodiments", "examples", "specific examples" or "some examples" etc. mean specific features, structures, materials or characteristics described in conjunction with the embodiment or example are included in at least one embodiment or example of the present disclosure. In this specification, the schematic representations of the above terms do not have to be the same embodiment or example. Moreover, specific features, structures, materials or characteristics described may be combined in any one or more embodiments or examples in a suitable manner. In addition, those skilled in the art may combine different embodiments or examples and characteristics of different embodiments or examples described in this specification without contradicting each other.

In addition, the terms "first" and "second" used in the present disclosure are only for description purpose, and may not be understood as relative importance of indication or implication or number of technical features indicated by implication. Therefore, features limiting "first" and "second" may explicitly or implicitly include at least one of the features. In the description of the present disclosure, "a plurality of" means at least two, for example two, three, etc., unless otherwise specified.

Any process or method descriptions described in the flowchart or in other ways herein may be understood as a module, a segment or a part of a code including one or more executable instructions configured to implement blocks of customized logical functions or processes, and scopes of embodiments of the present disclosure include additional implementations, which may include implement functions not be in the order shown or discussed including the substantially simultaneous manner according to functions involved or in reverse order, which should be understood by those skilled in the art of embodiments of the present disclosure.

The logic and/or blocks represented in the flowchart or described in other ways herein, for example, may be considered as an ordered list of an executable instruction configured to implement logic functions, which may be specifically implemented in any computer readable medium, for use by an instruction execution system, an apparatus or a device (such as a computer-based system, a system including a processor, or other systems that may obtain and execute instructions from an instruction execution system, an apparatus or a device) or in combination with the instruction execution systems, apparatuses or devices. A "computer readable medium" in this specification may be an apparatus that may contain, store, communicate, propagate or transmit a program for use by an instruction execution system, an apparatus or a device or in combination with the instruction execution systems, apparatuses or devices. A more specific example of a computer readable medium (a non-exhaustive list) includes the followings: an electronic connector (an electronic apparatus) with one or more cables, a portable computer disk box (a magnetic device), a random access memory (RAM), a read-only memory (ROM), an erasable programmable read-only memory (an EPROM or a flash memory), an optical fiber device, and a portable optical disk read-only memory (CDROM). In addition, a computer readable medium even may be paper or other suitable medium on which a program may be printed, since paper or other medium may be optically scanned, and then edited, interpreted or processed in other suitable ways if necessary to obtain a program electronically and store it in a computer memory.

It should be understood that all parts of the present disclosure may be implemented with a hardware, a software, a firmware and their combination. In the above implementation, multiple blocks or methods may be stored in a memory and implemented by a software or a firmware executed by a suitable instruction execution system. For example, if implemented with a hardware, they may be implemented by any of the following techniques or their combination known in the art as in another implementation: a discrete logic circuit with logic gate circuits configured to achieve logic functions on data signals, a special integrated circuit with appropriate combined logic gate circuits, a programmable gate array (PGA), a field programmable gate array (FPGA), etc.

Those skilled in the art may understand that all or part of blocks in the above embodiments may be implemented by a program to instruct relevant hardware, in which the program may be stored in a computer readable storage medium including one or combination of blocks in embodiments of the method when executing.

In addition, functional units in embodiments of the present disclosure may be integrated in a processing module, or may be physically existed separately, or two or more units may be integrated in a module. The above integrated module may be implemented in the form of a hardware or in the form of a software functional module. The integrated module may be stored in a computer readable storage medium if it is implemented in the form of a software functional module and sold and used as an independent product.

The foregoing storage medium may be a read-only memory, a magnetic disk or a compact disc, etc. It should be understood that, notwithstanding the embodiments of the present disclosure are shown and described above, the above embodiments are exemplary in nature and shall not be construed as a limitation of the present disclosure. Those skilled in the art may change, modify, substitute and vary the above embodiments within the scope of the present disclosure.

What is claimed is:

1. A method of data transmission, applicable for a data providing end, comprising:

generating a private key fragment of the data providing end, an encryption public key and an evaluation public key;

generating ciphertext data by encrypting local data with the encryption public key, and sending the ciphertext data to a data using end;

receiving a ciphertext calculation result sent by the data using end, wherein the ciphertext calculation result is determined by the data using end based on the evaluation public key and the ciphertext data received; and acquiring plaintext data by decrypting the ciphertext calculation result with the private key fragment;

wherein generating the private key fragment of the data providing end, the encryption public key and the evaluation public key comprises:

generating the private key fragment of the data providing end, and generating an encryption public key fragment of the data providing end and a target intermediate result corresponding to the evaluation public key based on the private key fragment;

broadcasting the encryption public key fragment and the target intermediate result;

receiving encryption public key fragments and target intermediate results sent by other data providing ends respectively; and generating the encryption public key based on respective encryption public key fragments, and generating the evaluation public key based on respective target intermediate results.

2. The method according to claim 1, wherein acquiring the plaintext data by decrypting the ciphertext calculation result with the private key fragment comprises:

obtaining first intermediate decrypted data by decrypting the ciphertext calculation result with the private key fragment, and sending the first intermediate decrypted data to other data providing ends;

receiving second intermediate decrypted data sent by other data providing ends; and acquiring the plaintext data by fusing the first intermediate decrypted data with the second intermediate decrypted data.

3. The method according to claim 1, wherein generating the private key fragment of the data providing end comprises:

acquiring key generation parameters, wherein, the key generation parameters comprise a public parameter and a public random number; and acquiring the private key fragment based on the public parameter and a private key generation algorithm.

4. The method according to claim 3, wherein generating the encryption public key fragment and the intermediate result corresponding to the evaluation public key based on the private key fragment comprises:

generating the encryption public key fragment based on the private key fragment, the public random number and an encryption public key generation algorithm; and generating the target intermediate result based on the private key fragment and an evaluation public key generation algorithm.

5. The method according to claim 4, wherein generating the target intermediate result based on the private key fragment and the evaluation public key generation algorithm comprises:

generating a first intermediate result of the evaluation public key based on the private key fragment, the public random number and the evaluation public key generation algorithm, and broadcasting the first intermediate result;

receiving respective first intermediate results sent by other data providing ends;

acquiring a second intermediate result of the evaluation public key based on the first intermediate result of the data providing end and the first intermediate results of other data providing ends; and acquiring the target intermediate result of the evaluation public key based on the private key fragment, the public random number and the second intermediate result, and broadcasting the target intermediate result.

6. A non-transitory computer-readable storage medium with a computer program stored thereon, wherein the program is executed by a processor to implement the method of claim 1.

7. A method of data transmission, applicable for a data using end, comprising:

receiving ciphertext data sent by respective data providing ends;

obtaining a ciphertext calculation result by performing an encryption calculation on respective pieces of ciphertext data with an evaluation public key; and sending the ciphertext calculation result to respective data providing ends for decryption;

wherein before receiving the ciphertext data sent by respective data providing ends, the method further comprising:

receiving target intermediate results of the evaluation public key sent by respective data providing ends; and acquiring the evaluation public key based on the target intermediate results.

8. The method according to claim 7, before receiving the ciphertext data sent by respective data providing ends, the method further comprising:

receiving encryption public key fragments sent by respective data providing ends; and acquiring the encryption public key based on the encryption public key fragments.

9. An electronic device, comprising a processor and a memory;

wherein the processor runs a program corresponding to an executable program code by reading the executable program code stored in the memory to implement the method of claim 7.

10. A non-transitory computer-readable storage medium with a computer program stored thereon, wherein the program is executed by a processor to implement the method of claim 7.

11. An electronic device, comprising a processor and a memory;

wherein the processor runs a program corresponding to an executable program code by reading the executable program code stored in the memory to implement:

generating a private key fragment of the data providing end, an encryption public key and an evaluation public key;

generating ciphertext data by encrypting local data with the encryption public key, and sending the ciphertext data to a data using end;

receiving a ciphertext calculation result sent by the data using end, wherein the ciphertext calculation result is determined by the data using end based on the evaluation public key and the ciphertext data received; and acquiring plaintext data by decrypting the ciphertext calculation result with the private key fragment;

wherein the processor is configured to implement:

generating the private key fragment of the data providing end, and generating an encryption public key fragment of the data providing end and a target intermediate result corresponding to the evaluation public key based on the private key fragment;

broadcasting the encryption public key fragment and the target intermediate result;

receiving encryption public key fragments and target intermediate results sent by other data providing ends respectively; and generating the encryption public key based on respective encryption public key fragments, and generating the evaluation public key based on respective target intermediate results.

12. The electronic device according to claim 11, wherein the processor is configured to implement:

obtaining first intermediate decrypted data by decrypting the ciphertext calculation result with the private key fragment, and sending the first intermediate decrypted data to other data providing ends;

receiving second intermediate decrypted data sent by other data providing ends; and acquiring the plaintext data by fusing the first intermediate decrypted data with the second intermediate decrypted data.

13. The electronic device according to claim 11, wherein the processor is configured to implement:

acquiring key generation parameters, wherein, the key generation parameters comprise a public parameter and a public random number; and acquiring the private key fragment based on the public parameter and a private key generation algorithm.

14. The electronic device according to claim 13, wherein the processor is configured to implement:

generating the encryption public key fragment based on the private key fragment, the public random number and an encryption public key generation algorithm; and generating the target intermediate result based on the private key fragment and an evaluation public key generation algorithm.

15. The electronic device according to claim 14, wherein the processor is configured to implement:

generating a first intermediate result of the evaluation public key based on the private key fragment, the public random number and the evaluation public key generation algorithm, and broadcasting the first intermediate result;

receiving respective first intermediate results sent by other data providing ends;

acquiring a second intermediate result of the evaluation public key based on the first intermediate result of the data providing end and the first intermediate results of other data providing ends; and acquiring the target intermediate result of the evaluation public key based on the private key fragment, the public random number and the second intermediate result, and broadcasting the target intermediate result.

* * * * *